(12) United States Patent
Misawa (10) Patent No.: US 10,523,067 B2
(45) Date of Patent: Dec. 31, 2019

(54) POWER TRANSMITTING DEVICE AND POWER TRANSMISSION SYSTEM

(71) Applicant: Toyota Jidosha Kabushiki Kaisha, Toyota-shi, Aichi-ken (JP)

(72) Inventor: Takahiro Misawa, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 53 days.

(21) Appl. No.: 15/877,671

(22) Filed: Jan. 23, 2018

(65) Prior Publication Data
US 2018/0212477 A1 Jul. 26, 2018

(30) Foreign Application Priority Data
Jan. 23, 2017 (JP) ................. 2017-009430

(51) Int. Cl.
| | | |
|---|---|---|
| *H01F 27/42* | (2006.01) | |
| *H01F 37/00* | (2006.01) | |
| *H01F 38/00* | (2006.01) | |
| *H02J 50/90* | (2016.01) | |
| *H02J 50/12* | (2016.01) | |
| *H02J 5/00* | (2016.01) | |

(Continued)

(52) U.S. Cl.
CPC .............. *H02J 50/90* (2016.02); *B60L 53/12* (2019.02); *B60L 53/37* (2019.02); *B60L 53/39* (2019.02); *H02J 5/005* (2013.01); *H02J 7/025* (2013.01); *H02J 50/12* (2016.02); *H04B 5/0037* (2013.01); *H04B 5/0081* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC .. H02J 50/90; H02J 50/12; H02J 7/025; H02J 5/005; B60L 53/12; B60L 53/37; B60L 53/39; H04B 5/0037; Y02T 90/122
See application file for complete search history.

(56) References Cited

U.S. PATENT DOCUMENTS

| | | |
|---|---|---|
| 2013/0127409 A1 | 5/2013 | Ichikawa |
| 2013/0193749 A1 | 8/2013 | Nakamura et al. |

(Continued)

FOREIGN PATENT DOCUMENTS

| | | |
|---|---|---|
| EP | 3104493 A1 | 12/2016 |
| JP | 2011259585 A | 12/2011 |

(Continued)

*Primary Examiner* — Rexford N Barnie
*Assistant Examiner* — Rasem Mourad
(74) *Attorney, Agent, or Firm* — Dinsmore & Shohl LLP (57) ABSTRACT

A power transmitting device includes a power transmitting unit, a first tuner, and a second tuner, and a controller. The power transmitting unit is configured to transmit AC transmission power to a power receiving device in a non-contact manner. The first tuner is configured to discretely tune a frequency of the transmission power. The second tuner is configured to discretely tune a resonance frequency of the power transmitting unit. The controller is configured to control the first and second tuners such that the number of tunings using one tuner having the smaller frequency tuning interval of the first and second tuners is larger than the number of tunings using the other tuner.

5 Claims, 9 Drawing Sheets

(51) Int. Cl.
    *B60L 53/37*     (2019.01)
    *H02J 7/02*     (2016.01)
    *H04B 5/00*     (2006.01)
    *B60L 53/39*     (2019.01)
    *B60L 53/12*     (2019.01)

(56) References Cited

U.S. PATENT DOCUMENTS

| | | | |
|---|---|---|---|
| 2013/0342025 A1* | 12/2013 | Cook | H02J 5/005 |
| | | | 307/104 |
| 2014/0253029 A1 | 9/2014 | Uchida et al. | |
| 2015/0008877 A1 | 1/2015 | Ichikawa et al. | |
| 2015/0097438 A1* | 4/2015 | Aioanei | H02J 7/025 |
| | | | 307/104 |
| 2016/0164346 A1* | 6/2016 | Zhang | H02J 50/12 |
| | | | 307/104 |
| 2016/0344237 A1* | 11/2016 | Cho | H02J 50/12 |
| 2016/0365752 A1 | 12/2016 | Misawa et al. | |
| 2017/0098965 A1* | 4/2017 | Kikuchi | B25J 19/0045 |
| 2017/0126065 A1* | 5/2017 | Park | H02J 50/12 |
| 2017/0187243 A1* | 6/2017 | Sugiyama | H02J 50/12 |
| 2017/0217325 A1* | 8/2017 | DeBaun | H02J 50/80 |
| 2017/0237297 A1* | 8/2017 | Moes | H02M 7/5387 |
| | | | 307/104 |

FOREIGN PATENT DOCUMENTS

| | | | | |
|---|---|---|---|---|
| JP | 2013-110822 A | 6/2013 | | |
| JP | 2013-126327 A | 6/2013 | | |
| JP | 2013-146148 A | 7/2013 | | |
| JP | 2013-146154 A | 7/2013 | | |
| JP | 2013154815 A | 8/2013 | | |
| JP | 2017-005865 A | 1/2017 | | |
| KR | 10-20140097375 A | 8/2014 | | |
| WO | 2011/127449 A2 | 10/2011 | | |
| WO | 2015/075514 A1 | 5/2015 | | |
| WO | WO-2015075514 A1 * | 5/2015 | ............ | H02J 7/0027 |

* cited by examiner

POWER TRANSMITTING DEVICE AND POWER TRANSMISSION SYSTEM

CROSS-REFERENCE TO RELATED APPLICATIONS

This application claims priority to Japanese Patent Application No. 2017-009430 filed on Jan. 23, 2017 including the specification, drawings and abstract is incorporated herein by reference in its entirety.

BACKGROUND

1. Technical Field

The present disclosure relates to a power transmitting device and a power transmission system, and more particularly, to a power transmitting device and a power transmission system that transmit AC transmission power to a power receiving device in a non-contact manner.

2. Description of Related Art

A power transmission system that transmits electric power from a power transmitting device to a power receiving device in a non-contact manner is known (for example, see Japanese Unexamined Patent Application Publication No. 2011-259585 (JP 2011-259585 A), Japanese Unexamined Patent Application Publication No. 2013-154815 (JP 2013-154815 A), Japanese Unexamined Patent Application Publication No. 2013-146154 (JP 2013-146154 A), Japanese Unexamined Patent Application Publication No. 2013-146148 (JP 2013-146148 A), Japanese Unexamined Patent Application Publication No. 2013-110822 (JP 2013-110822 A), and Japanese Unexamined Patent Application Publication No. 2013-126327 (JP 2013-126327 A)). For example, JP 2011-259585 A discloses a power supply device for a vehicle that converts AC power supplied from a system power supply into high-frequency power using a high-frequency power driver and supplies the high-frequency power to a power transmitting coil. The power supply device for a vehicle includes a CCD camera that measures a distance between the power transmitting coil and a power receiving coil of a power receiving device and a frequency tuning unit that tunes a resonance frequency of the power transmitting coil based on the inter-coil distance measured with the CCD camera. According to this configuration, it is possible to enhance power transmission efficiency from the power transmitting coil to the power receiving coil (see JP 2011-259585 A).

SUMMARY

In general, a frequency of transmission power (hereinafter also referred to as a "transmission power frequency") needs to be tuned in a predetermined frequency band. By providing the frequency tuning unit that tunes the resonance frequency of the power transmitting unit (the power transmitting coil) as described in JP 2011-259585 A, it is possible to enhance power transmission efficiency by improving frequency characteristics indicating a relationship between a transmission power frequency and a magnitude of transmission power in a predetermined frequency band. The transmission power frequency can be tuned to enhance the power transmission efficiency in a predetermined frequency band using the high-frequency power driver that generates the transmission power which is supplied to the power transmitting unit (the power transmitting coil). However, there is a likelihood of a problem that tuning to an appropriate frequency is impossible or a long time is required for frequency tuning occurring due to interference of control for tuning the resonance frequency with control for tuning the transmission power frequency.

The present disclosure provides a power transmitting device and a power transmission system that transmit AC transmission power to a power receiving device in a non-contact manner, in which interference of frequency control can be suppressed to realize rapid tuning of frequency.

A power transmitting device according to the present disclosure includes a power transmitting unit, a first tuner, a second tuner, and a controller. The power transmitting unit is configured to transmit AC transmission power to a power receiving device in a non-contact manner. The first tuner is configured to discretely tune a transmission power frequency. The second tuner is configured to discretely tune a resonance frequency of the power transmitting unit. The controller is configured to control the first and second tuners such that the number of tunings using one tuner having the smaller frequency tuning interval of the first and second tuners is larger than the number of tunings using the other tuner.

A power transmission system according to the present disclosure includes a power transmitting device and a power receiving device that receives AC transmission power output from the power transmitting device in a non-contact manner. The power transmitting device includes a power transmitting unit, a first tuner, a second tuner, and a controller. The power transmitting unit is configured to transmit AC transmission power to a power receiving device in a non-contact manner. The first tuner is configured to discretely tune a transmission power frequency. The second tuner is configured to discretely tune a resonance frequency of the power transmitting unit. The controller is configured to control the first and second tuners such that the number of tunings using one tuner having the smaller frequency tuning interval of the first and second tuners is larger than the number of tunings using the other tuner.

In the power transmitting device and the power transmission system, the first and second tuners are controlled such that the number of tunings using one tuner having the smaller frequency tuning interval of the first and second tuners is larger than the number of tunings using the other tuner. Accordingly, it is possible to suppress interference of control using the first tuner (tuning of the transmission power frequency) and control using the second tuner (tuning of the resonance frequency) and to rapidly tune the frequency using the tuner having the smaller frequency tuning interval under the frequency which has been tuned by the tuner having the larger frequency tuning interval. Accordingly, the power transmitting device and the power transmission system can suppress interference of frequency control and realize rapid frequency tuning.

The first tuner may be configured to tune the transmission power frequency at a first frequency interval, the second tuner may be configured to tune the resonance frequency at a second frequency interval which is greater than the first frequency interval, and the controller may be configured to control the first and second tuners such that the number of tunings of the transmission power frequency using the first tuner is larger than the number of tunings of the resonance frequency using the second tuner.

In the power transmitting device and the power transmission system, the first tuner tunes the transmission power frequency at the first frequency interval and with the relatively large number of tunings, and the second tuner tunes the resonance frequency at the second frequency interval larger than the first frequency interval and with the relatively small number of tunings. Accordingly, it is possible to suppress interference of control using the first tuner (tuning of the transmission power frequency) and control using the second tuner (tuning of the resonance frequency) and to accurately and rapidly tune the transmission power frequency using the first tuner under the frequency characteristics (the resonance frequency) which have been roughly tuned by the second tuner. Accordingly, the power transmitting device and the power transmission system can suppress interference of frequency control and realize rapid frequency tuning.

The first tuner may include an inverter configured to generate the transmission power and supply the generated transmission power to the power transmitting unit and to tune the frequency of the transmission power. The second tuner may include a capacitor configured to tune the resonance frequency by changing its capacitance, the capacitor being disposed between the inverter and the power transmitting unit. The controller may be configured to set an initial capacitance of the capacitor with starting of power transmission from the power transmitting unit and to control the inverter such that the frequency of the transmission power is tuned.

According to this configuration, it is possible to rapidly tune the transmission power frequency using the inverter under the frequency characteristics (the resonance frequency) based on the capacitance of the capacitor initially set with starting of power transmission. Accordingly, the power transmitting device can suppress interference of tuning of the resonance frequency based on setting of the capacitance of the capacitor and tuning of the transmission power frequency using the inverter and realize rapid frequency tuning using the inverter.

The power transmitting device according to the present disclosure may further include a position detector configured to detect a positional relationship of a power receiving unit of the power receiving device relative to the power transmitting unit. Data indicating a relationship between the positional relationship of the power receiving unit relative to the power transmitting unit and the capacitance of the capacitor may be prepared, and the controller may set the initial capacitance of the capacitor based on the detection result of the position detector with reference to the data.

According to this configuration, since setting accuracy of the initial capacitance of the capacitor is improved using the detection result of the position detector, it is possible to realize rapider frequency tuning using the inverter.

The capacitor may be a capacitor of a filter circuit that is disposed between the inverter and the power transmitting unit.

According to this configuration, since the capacitor of the filter circuit is used as the second tuner, it is not necessary to separately provide the capacitor as the second tuner independently from the filter circuit.

According to the present disclosure, it is possible to suppress interference of frequency control and to realize rapid frequency tuning in the power transmitting device and the power transmission system that transmit AC transmission power to a power receiving device in a non-contact manner.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure will be described in detail with reference to the accompanying drawings. In the drawings, the same or corresponding elements will be referenced by the same reference signs and description thereof will not be repeated.

Figure 1:
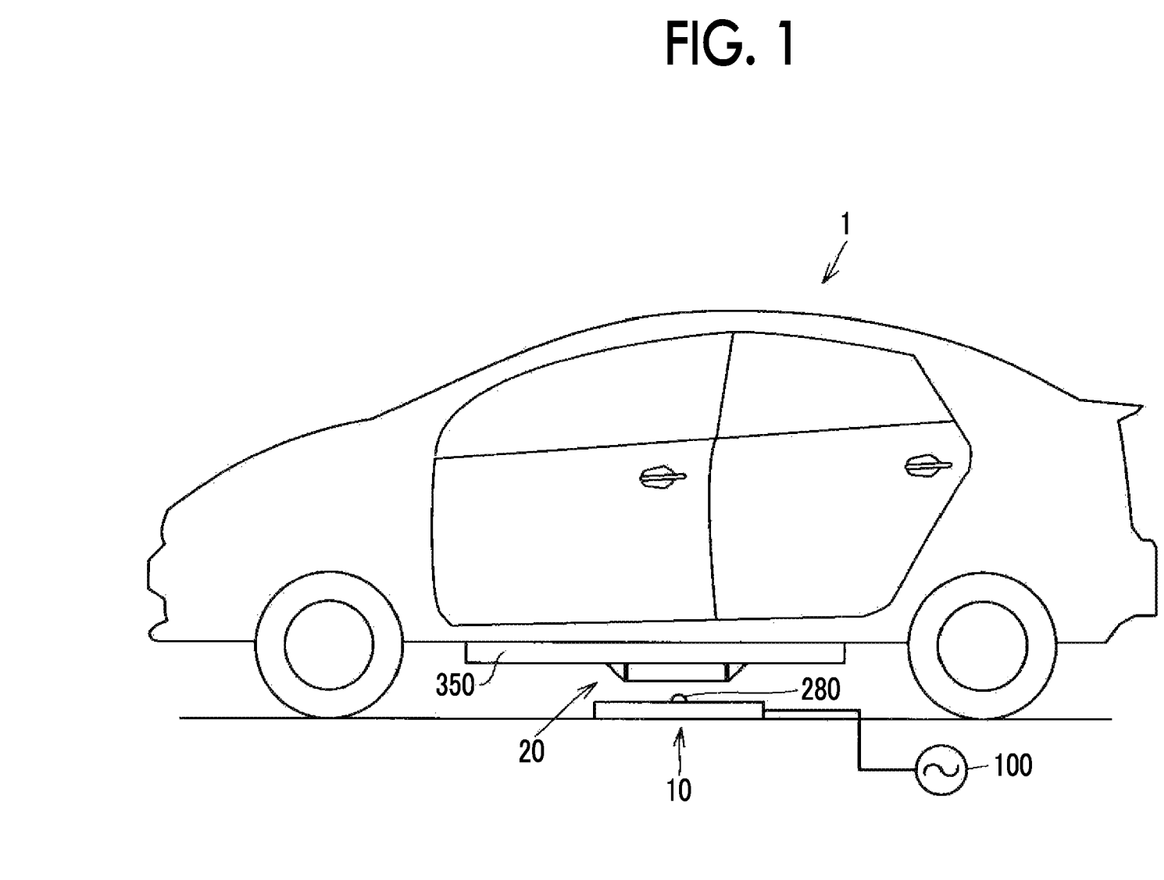
FIG. 1 is a diagram illustrating an overall power transmission system to which a power transmitting device according to an embodiment of the present disclosure is applied.

<Configuration of power transmission system> FIG. 1 is a diagram illustrating an overall power transmission system to which a power transmitting device according to an embodiment of the present disclosure is applied. Referring to FIG. 1, the power transmission system includes a vehicle 1 and a power transmitting device 10. The vehicle 1 includes a power receiving device 20. The power receiving device 20 is disposed on the bottom surface of the vehicle 1 and is disposed, for example, on the bottom surface (a road surface side) of a power storage device 350 which is provided on the bottom surface of the vehicle 1.

The power transmitting device 10 is supplied with electric power from an AC power source 100 (for example, a commercial system power supply). The power transmitting device 10 is provided on the ground surface and is configured to transmit electric power to the power receiving device 20 via a magnetic field in a non-contact manner in a state in which the vehicle 1 is positioned such that the power receiving device 20 of the vehicle 1 faces the power transmitting device 10.

The power transmitting device 10 includes a camera 280. The camera 280 includes a fish-eye lens and is disposed substantially at the center of the top surface of the power transmitting device 10. The camera 280 includes the fish-eye lens and thus is configured to image a wide space including the power receiving device 20 when the vehicle 1 moves to the power transmitting device 10. It is possible to detect a positional relationship of the power receiving device 20 relative to the power transmitting device 10 using an image captured by the camera 280.

Figure 2:
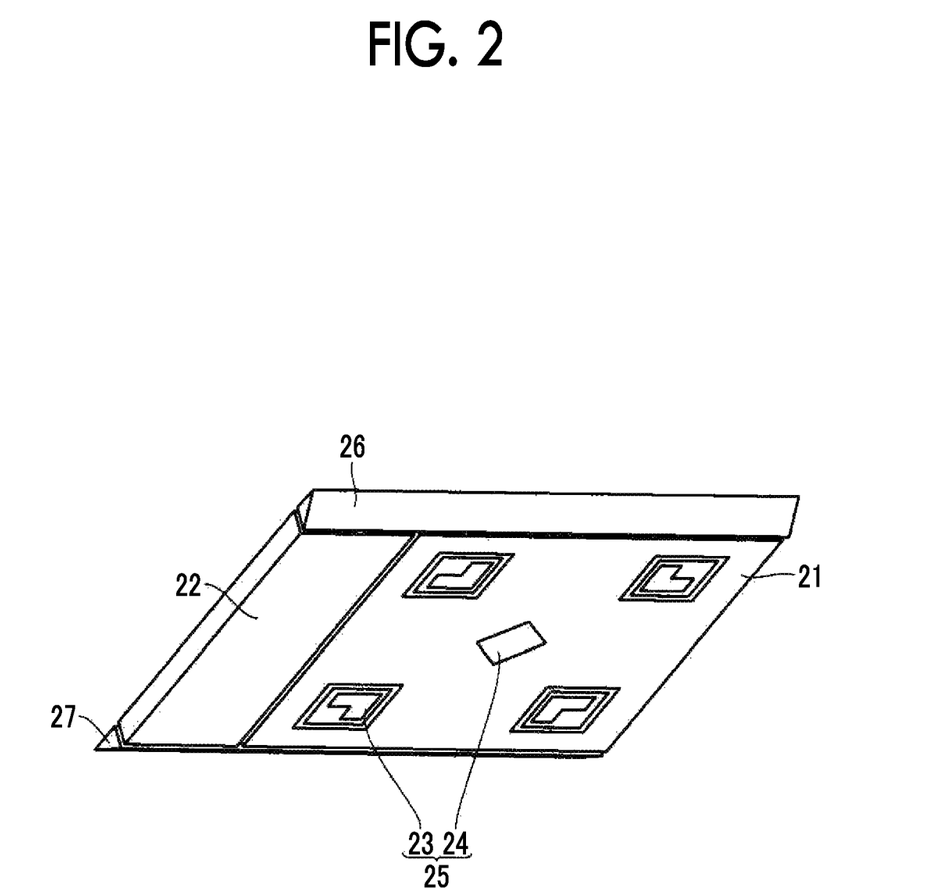
FIG. 2 is a diagram illustrating an example of marks which are provided in a power receiving device.

Specifically, when the vehicle 1 moves to the power transmitting device 10, the surroundings of the camera 280 are imaged by the camera 280 and image data is transmitted to the vehicle 1. As shown in FIG. 2, marks 25 for detecting the position of the power receiving device 20 using the camera 280 are provided on the bottom surface of the power receiving device 20 (the surface facing the power transmitting device 10).

FIG. 2 is a diagram illustrating an example of marks 25 which are provided on the power receiving device 20. Referring to FIG. 2, the power receiving device 20 includes a resin case 21, a metal case 22, and protective members 26 and 27. The resin case 21 accommodates a power receiving coil (not illustrated) that receives electric power from the power transmitting device 10 in a non-contact manner. The metal case 22 accommodates electrical units (not illustrated) such as a filter circuit or a rectifier unit. The protective members 26 and 27 are disposed on the front side and the rear side in the vehicle front-rear direction of the resin case 21 and the metal case 22 and serve to protect the power receiving device 20 from interference with a road surface.

In this example, the marks 25 includes corner marks 23 provided at four corners of the resin case 21 and center mark 24 provided at the substantial center of the resin case 21. When the vehicle 1 (the power receiving device 20) is positioned to the power transmitting device 10, imaging with the camera 280 is performed, the marks 25 are detected from the image data, and the relative positional relationship (a horizontal direction and a gap) of the power transmitting device 10 and the power receiving device 20 is calculated based on the sizes and positions of the detected marks 25 including the corner marks 23 and the center mark 24.

Figure 3:
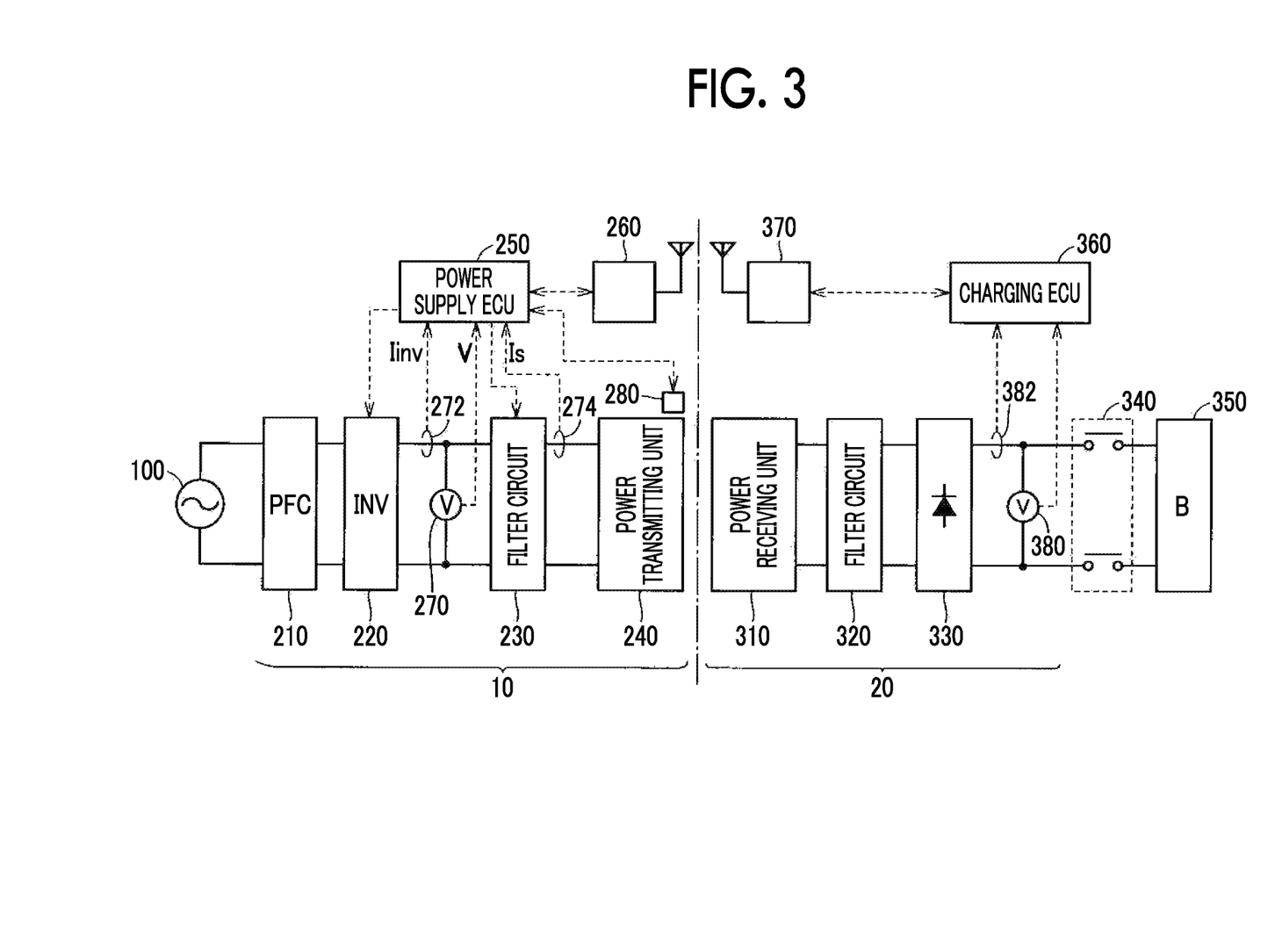
FIG. 3 is a diagram illustrating a configuration of the power transmission system illustrated in FIG. 1.

FIG. 3 is a diagram illustrating a configuration of the power transmission system illustrated in FIG. 1. Referring to FIG. 3, the power transmitting device 10 includes a power factor correction (PFC) circuit 210, an inverter 220, a filter circuit 230, and a power transmitting unit 240. The power transmitting device 10 further includes a power supply electronic control unit (ECU) 250, a communication unit 260, a voltage sensor 270, current sensors 272 and 274, and a camera 280 (FIG. 1).

The PFC circuit 210 rectifies and steps up electric power supplied from the AC power source 100 and supplies the resultant electric power to the inverter 220 and corrects a power factor by approximating an input current to a sinusoidal wave. Various known PFC circuits can be employed as the PFC circuit 210. A rectifier not having a power factor correcting function may be employed instead of the PFC circuit 210.

The inverter 220 is controlled by a power supply ECU 250, and converters DC power received from the PFC circuit 210 into transmission power (AC) with a predetermined frequency (for example, several tens kHz). The inverter 220 can discretely tune the transmission power frequency with a predetermined resolution by changing a switching frequency in accordance with a control signal from the power supply ECU 250. The inverter 220 is constituted, for example, by a single-phase full bridge circuit.

The filter circuit 230 is disposed between the inverter 220 and the power transmitting unit 240 and can reduce harmonic noise generated from the inverter 220. The filter circuit 230 is constituted by an LC filter including an inductor and a capacitor. As will be described later, the capacitor of the filter circuit 230 is configured to discretely change its capacitance and can discretely tune the resonance frequency of the power transmitting unit 240 by changing the capacitance in accordance with a control signal from the power supply ECU 250.

The power transmitting unit 240 receives AC power (transmission power) generated by the inverter 220 from the inverter 220 via the filter circuit 230 and transmits the AC power to a power receiving unit 310 of the power receiving device 20 via a magnetic field generated around the power transmitting unit 240 in a non-contact manner. The power transmitting unit 240 includes a resonance circuit that transmits electric power to the power receiving unit 310 in a non-contact manner (which will be described later). The resonance circuit can be constituted by a coil and a capacitor, but the capacitor may not be provided when a desired resonant state is formed by only the coil.

The voltage sensor 270 detects an output voltage V of the inverter 220 and outputs the detected value to the power supply ECU 250. The current sensor 272 detects a current flowing in the inverter 220, that is, an output current Iinv of the inverter 220, and outputs the detected value to the power supply ECU 250. Transmission power which is supplied from the inverter 220 to the power transmitting unit 240 can be detected based on the detected values of the voltage sensor 270 and the current sensor 272. The current sensor 274 detects a current Is flowing in the power transmitting unit 240 and outputs the detected value to the power supply ECU 250.

The communication unit 260 is configured to wirelessly communicate with a communication unit 370 of the power receiving device 20. The communication unit 260 transmits and receives information on start/stop of power transmission to and from the power receiving device 20 or receives power-receiving conditions (such as a power-receiving voltage, a power-receiving current, and a reception power) of the power receiving device 20 from the power receiving device 20 in addition to receiving a target (target power) of the transmission power which is transmitted from the power receiving device 20. The communication unit 260 transmits image data acquired by the camera 280 to the power receiving device 20 when positioning of the vehicle 1 (the power receiving device 20) relative to the power transmitting device 10 is performed.

The power supply ECU 250 includes a central processing unit (CPU), a read only memory (ROM) that stores a processing program and the like, a random access memory (RAM) that temporarily stores data, and input and output ports that are used to input and output various signals, receives signals from the above-mentioned sensors, and performs control of various devices in the power transmitting device 10. For example, the power supply ECU 250 performs switching control of the inverter 220 such that the inverter 220 generates transmission power (AC) when transmission of power from the power transmitting device 10 to the power receiving device 20 is performed. The control is not limited to a process using software, but may be performed by a process using dedicated hardware (electronic circuit).

In the power transmitting device 10 according to this embodiment, as principal control which is performed by the power supply ECU 250, the power supply ECU 250 performs control (hereinafter also referred to as "transmission power control") for matching the magnitude of the transmission power with target power at the time of performing transmission of power from the power transmitting device 10 to the power receiving device 20. Specifically, the power supply ECU 250 controls the magnitude of the transmission power such that it reaches the target power by tuning a duty of the output voltage of the inverter 220.

The power supply ECU 250 performs control (hereinafter also referred to as "first frequency tuning control") of tuning the transmission power frequency such that the current Is flowing in a power transmitting coil (which will be described later) included in the power transmitting unit 240 is minimized when the transmission power is maintained. Specifically, the power supply ECU 250 performs the first frequency tuning control by controlling the inverter 220. By tuning the transmission power frequency such that the current Is is minimized, it is possible to enhance power transmission efficiency between the power transmitting unit 240 and the power receiving unit 310. An operable range (a tunable range) of the transmission power frequency is determined in advance and the power supply ECU 250 performs the first frequency tuning control in the frequency operable range.

When the duty of the output voltage of the inverter 220 is maintained, the power supply ECU 250 performs control (hereinafter also referred to as "second frequency tuning control") of tuning the resonance frequency of the power transmitting unit 240 such that the transmission power increases generally in the frequency operable range. Specifically, the power supply ECU 250 performs the second frequency tuning control by tuning the capacitance of the capacitor of the filter circuit 230.

The first frequency tuning control and the second frequency tuning control are control associated with frequency, and the first and second frequency tuning control is performed such that the first frequency tuning control and the second frequency tuning control does not interfere with each other. Specifically, the first and second frequency tuning control is performed such that the number of tunings of the transmission power frequency by the first frequency tuning control is larger than the number of tunings of the resonance frequency by the second frequency tuning control. This will be described later in detail.

The power supply ECU 250 outputs image data acquired by the camera 280 to the communication unit 260 when the vehicle 1 (the power receiving device 20) is positioned relative to the power transmitting device 10. As will be described later, in the vehicle 1, fish-eye correction is performed on the image data received from the power transmitting device 10 and a relative positional relationship between the power transmitting device 10 and the power receiving device 20 is calculated based on the sizes and positions of the marks 25 of the power receiving device 20 which are detected from the corrected image data. The fish-eye correction on the image data may be performed by the power supply ECU 250.

On the other hand, the power receiving device 20 includes a power receiving unit 310, a filter circuit 320, a rectifier unit 330, a relay circuit 340, and a power storage device 350. The power receiving device 20 further includes a charging ECU 360, a communication unit 370, a voltage sensor 380, and a current sensor 382.

The power receiving unit 310 receives electric power (AC) output from the power transmitting unit 240 of the power transmitting device 10 via a magnetic field in a non-contact manner. The power receiving unit 310 includes, for example, a resonance circuit (not illustrated) that receives power from the power transmitting unit 240 in a non-contact manner. The resonance circuit can include a coil and a capacitor, but the capacitor may not be provided when a desired resonant state is formed using only the coil.

The filter circuit 320 is disposed between the power receiving unit 310 and the rectifier unit 330, and reduces harmonic noise which is generated at the time of power reception by the power receiving unit 310. The filter circuit 320 is constituted, for example, by an LC filter including an inductor and a capacitor. The rectifier unit 330 rectifies AC power received by the power receiving unit 310 and outputs the rectified AC power to the power storage device 350. The rectifier unit 330 includes a smoothing capacitor in addition to a rectifier.

The power storage device 350 is a DC power source which is rechargeable and includes a secondary battery such as a lithium-ion battery or a nickel-hydride battery. The power storage device 350 stores electric power output from the rectifier unit 330. The power storage device 350 supplies the stored electric power to vehicle driving devices (such as an inverter and a driving motor) which are not illustrated. An electric double-layer capacitor or the like can be employed as the power storage device 350.

The relay circuit 340 is disposed between the rectifier unit 330 and the power storage device 350. The relay circuit 340 is turned on at the time of charging the power storage device 350 using the power transmitting device 10. The voltage sensor 380 detects an output voltage (a power-receiving voltage) of the rectifier unit 330 and outputs the detected value to the charging ECU 360. The current sensor 382 detects an output current (a power-receiving current) from the rectifier unit 330 and outputs the detected value to the charging ECU 360. The reception power (which corresponds to charging power of the power storage device 350) received by the power receiving unit 310 can be detected based on the detected values of the voltage sensor 380 and the current sensor 382. The voltage sensor 380 and the current sensor 382 may be disposed between the power receiving unit 310 and the rectifier unit 330 (for example, between the filter circuit 320 and the rectifier unit 330).

The charging ECU 360 includes a CPU, a ROM, a RAM, and input and output ports (all of which are not illustrated), receives signals from the sensors and the like, and controls various units of the power receiving device 20. The control is not limited to a process by software, but may be performed by dedicated hardware (electronic circuit).

As principal control which is performed by the charging ECU 360, the charging ECU 360 generates a target (target power) of the transmission power in the power transmitting device 10 such that the reception power by the power receiving device 20 reaches a desired target while electric power is being received from the power transmitting device 10. Specifically, the charging ECU 360 generates the target of the transmission power in the power transmitting device 10 based on a difference between the target of the reception power and the detected value. Then, the charging ECU 360 transmits the generated target (target power) of the transmission power to the power transmitting device 10 via the communication unit 370.

The charging ECU 360 receives image data acquired by the camera 280 from the communication unit 370 when the vehicle 1 is positioned relative to the power transmitting device 10. The charging ECU 360 performs fish-eye correction on the received image data and detects the marks 25 of the power receiving device 20 from the corrected image data. Then, the charging ECU 360 calculates a relative positional relationship between the power transmitting device 10 and the power receiving device 20 based on the sizes and positions of the marks 25 of the power receiving device 20. Data (a position detection result) indicating the relative positional relationship between the power transmitting device 10 and the power receiving device 20 is transmitted to the power transmitting device 10 via the communication unit 370.

The communication unit 370 is configured to wirelessly communicate with the communication unit 260 of the power transmitting device 10. The communication unit 370 transmits and receives information on start/stop of transmission of power to and from the power transmitting device 10 or transmits power-receiving conditions (such as a power-receiving voltage, a power-receiving current, and a reception power) of the power receiving device 20 to the power transmitting device 10, in addition to transmitting the target (target power) of the transmission power generated by the charging ECU 360 to the power transmitting device 10. As described above, the communication unit 370 receives the data (the position detection result) indicating the relative positional relationship between the power transmitting device 10 and the power receiving device 20 from the charging ECU 360 and transmits the received relative positional relationship to the power transmitting device 10.

Figure 4:
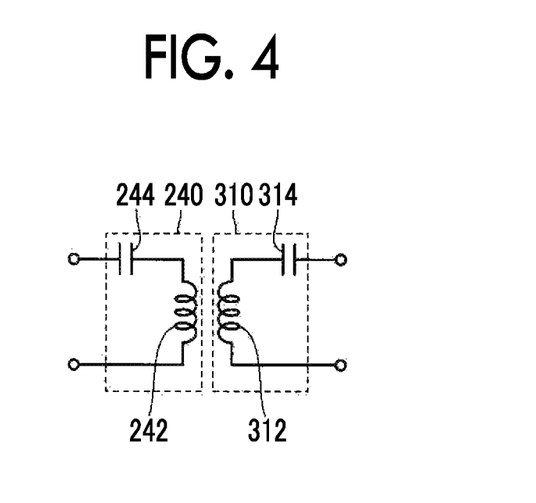
FIG. 4 is a diagram illustrating an example of a circuit configuration of a power transmitting unit and a power receiving unit illustrated in FIG. 3.

FIG. 4 is a diagram illustrating an example of a circuit configuration of the power transmitting unit 240 and the power receiving unit 310 illustrated in FIG. 3. Referring to FIG. 4, the power transmitting unit 240 includes a power transmitting coil 242 and a capacitor 244. The capacitor 244 is connected in series to the power transmitting coil 242 and forms a resonance circuit along with the power transmitting coil 242. In some embodiments, a Q value indicating resonance intensity of the resonance circuit which is constituted by the power transmitting coil 242 and the capacitor 244 be equal to or greater than 100.

The power receiving unit 310 includes a power receiving coil 312 and a capacitor 314. The capacitor 314 is connected in series to the power receiving coil 312 and forms a resonance circuit along with the power receiving coil 312. In some embodiments, a Q value of the resonance circuit constituted by the power receiving coil 312 and the capacitor 314 be equal to or greater than 100. In each of the power transmitting unit 240 and the power receiving unit 310, the capacitor may be connected in parallel to the coil.

Although not particularly illustrated, the structures of the power transmitting coil 242 and the power receiving coil 312 are not particularly limited. For example, when the power transmitting unit 240 and the power receiving unit 310 oppose each other, a coil having a spiral shape or a helical shape wound on a shaft parallel to a direction in which the power transmitting unit 240 and the power receiving unit 310 are arranged can be employed as each of the power transmitting coil 242 and the power receiving coil 312. Alternatively, when the power transmitting unit 240 and the power receiving unit 310 oppose each other, a coil formed by winding an electric wire on a ferrite slab of which a normal direction is parallel to the direction in which the power transmitting unit 240 and the power receiving unit 310 are arranged may be employed as each of the power transmitting coil 242 and the power receiving coil 312.

Figure 5:
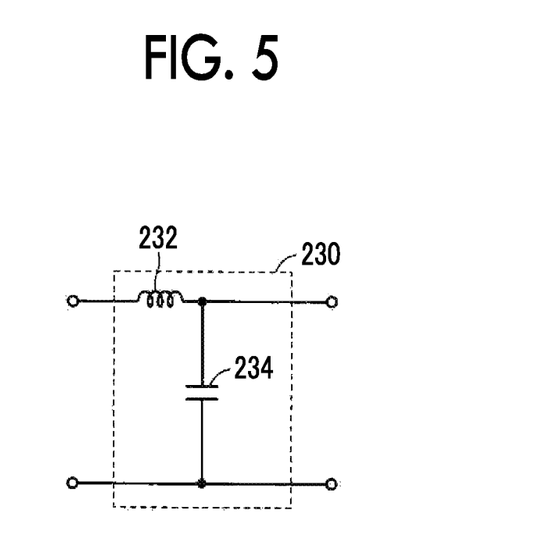
FIG. 5 is a diagram illustrating an example of a circuit configuration of a filter circuit illustrated in FIG. 3.

FIG. 5 is a diagram illustrating an example of a circuit configuration of the filter circuit 230 illustrated in FIG. 3. Referring to FIG. 5, the filter circuit 230 includes a coil 232 and a capacitor 234. The coil 232 is disposed in at least one of a pair of power lines between the inverter 220 and the power transmitting unit 240, and the capacitor 234 is connected between the power lines between the coil 232 and the power transmitting unit 240 (not illustrated). The capacitor 234 is configured to discretely change its capacitance and can change the capacitance in accordance with a control signal from the power supply ECU 250 (not illustrated).

Figure 6:
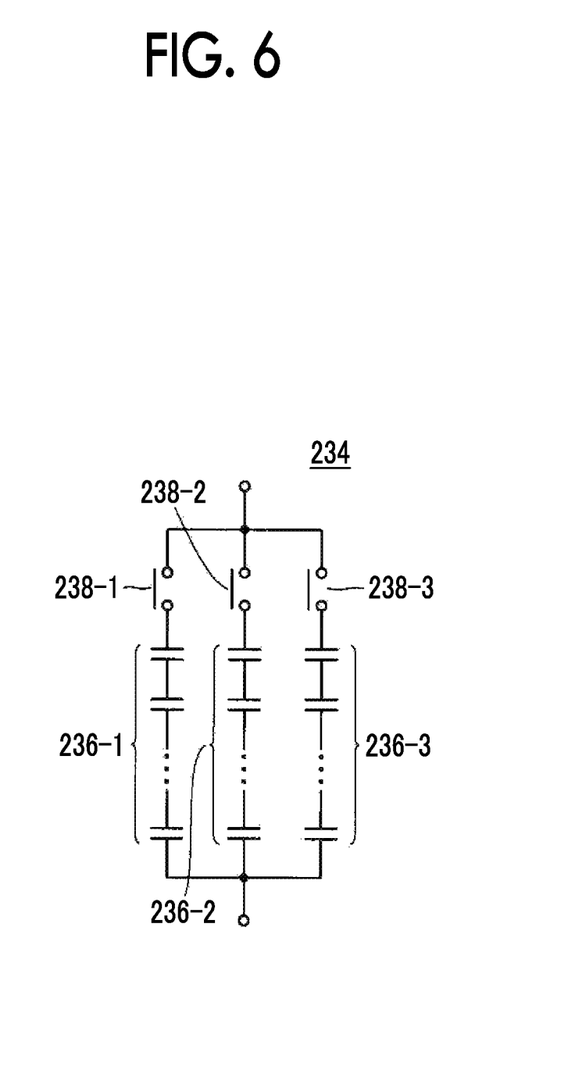
FIG. 6 is a diagram illustrating an example of a configuration of a capacitor illustrated in FIG. 5.

FIG. 6 is a diagram illustrating an example of a configuration of the capacitor 234 illustrated in FIG. 5. Referring to FIG. 6, the capacitor 234 includes capacitive portions 236-1 to 236-3 and relays 238-1 to 238-3 which are connected in series to the capacitive portions 236-1 to 236-3. Each of the capacitive portions 236-1 to 236-3 includes, for example, a plurality of ceramic capacitors which are connected in series. The relays 238-1 to 238-3 are turned on/off in accordance with a control signal from the power supply ECU 250. By appropriately controlling the relays 238-1 to 238-3, it is possible to discretely change the capacitance of the capacitor 234.

Referring back to FIG. 3, in the power transmitting device 10 of the power transmission system, AC transmission power is supplied from the inverter 220 to the power transmitting unit 240 via the filter circuit 230. When AC transmission power is supplied to the power transmitting unit 240, energy (electric power) migrates from the power transmitting unit 240 to the power receiving unit 310 via a magnetic field which is formed between the power transmitting coil 242 of the power transmitting unit 240 and the power receiving coil 312 of the power receiving unit 310. The energy (electric power) migrating to the power receiving unit 310 is supplied to the power storage device 350 via the filter circuit 320 and the rectifier unit 330.

Figure 7:
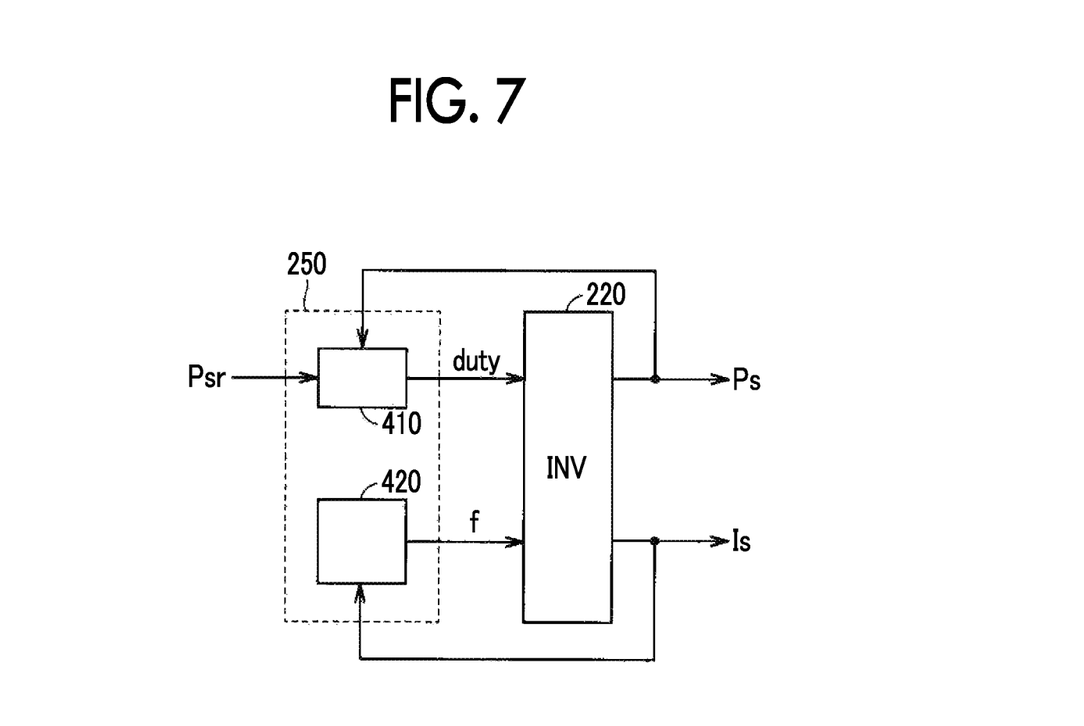
FIG. 7 is a control block diagram of transmission power control and first frequency tuning control which are performed by a power supply ECU illustrated in FIG. 3.

FIG. 7 is a control block diagram illustrating transmission power control and first frequency tuning control which are performed by the power supply ECU 250 illustrated in FIG. 3. Referring to FIG. 7, the power supply ECU 250 includes a controller 410 that performs the transmission power control and a controller 420 that performs the first frequency tuning control.

The controller 410 receives target power Psr indicating a target value of transmission power Ps and a detected value of the transmission power Ps. The target power Psr can be generated, for example, based on the power-receiving conditions of the power receiving device 20. In this embodiment, in the power receiving device 20, the target power Psr of the transmission power Ps is generated based on a difference between a target value of reception power and the detected value, and the generated target power is transmitted from the power receiving device 20 to the power transmitting device 10. The transmission power Ps can be calculated, for example, based on the detected values of the voltage sensor 270 and the current sensor 272 (FIG. 3).

The controller 410 generates a duty command value of the output voltage of the inverter 220 based on the difference between the target power Psr and the transmission power Ps. A duty of the output voltage of the inverter 220 is defined by a ratio of a positive (or negative) voltage output time to a period of an output voltage waveform (rectangular wave). By changing an operating time of a switching element (of which an ON/OFF period ratio is 0.5) of the inverter 220, it is possible to adjust a duty of the output voltage of the inverter. For example, the controller 410 calculates an amount of operation by performing PI control (proportional integral control) with the difference between the target power Psr and the transmission power Ps as an input, and sets the calculated amount of operation as the duty command value. Accordingly, the duty of the output voltage is adjusted such that the transmission power Ps approaches the target power Psr, and the transmission power Ps is controlled such that it approaches the target power Psr.

The controller 420 receives the detected value of the current Is flowing in the power transmitting coil 242 (FIG. 4). The controller 420 tunes a transmission power frequency f such that the current Is is minimized while the transmission power is kept constant. By tuning the transmission power frequency f in this way, it is possible to enhance power transmission efficiency between the power transmitting unit 240 and the power receiving unit 310. This will be described below in brief.

Referring back to FIG. 4, it is assumed in the power transmitting unit 240 that inductance of the power transmitting coil 242 is L1 and capacitance of the capacitor 244 is C1. On the other hand, it is assumed in the power receiving unit 310 that inductance of the power receiving coil 312 is L2 and capacitance of the capacitor 314 is C2. When coil resistance of the power transmitting coil 242 is defined as r1, coil resistance of the power receiving coil 312 is defined as r2, and impedance of a circuit portion subsequent to the filter circuit 320 (FIG. 3) in the power receiving device 20 is defined as RL, the power transmission efficiency η between the power transmitting coil 242 and the power receiving coil 312 is expressed by the following equation.

$$\eta = \frac{RL}{RL + r2 + r1\left|\frac{I1}{I2}\right|^2} \quad \text{Equation (1)}$$

Here, I1 denotes a current (that is, the current Is) flowing in the power transmitting coil 242, and I2 denotes a current flowing in the power receiving coil 312. While electric power is kept constant, the current I2 and the impedance RL are substantially constant. Accordingly, from Equation (1), it can be understood that the power transmission efficiency η is inversely proportional to a square of the current I1. That is, as the current flowing in the power transmitting coil 242 decreases, the power transmission efficiency η increases.

In this embodiment, known extremum search control of searching an extremum of a control quantity by applying a vibration signal to a control target is applied to the controller 420. The controller 420 searches for an optimal frequency at which the current Is flowing in the power transmitting coil 242 is minimized by causing the transmission power frequency to vibrate finely using the known extremum search control.

Figure 8:
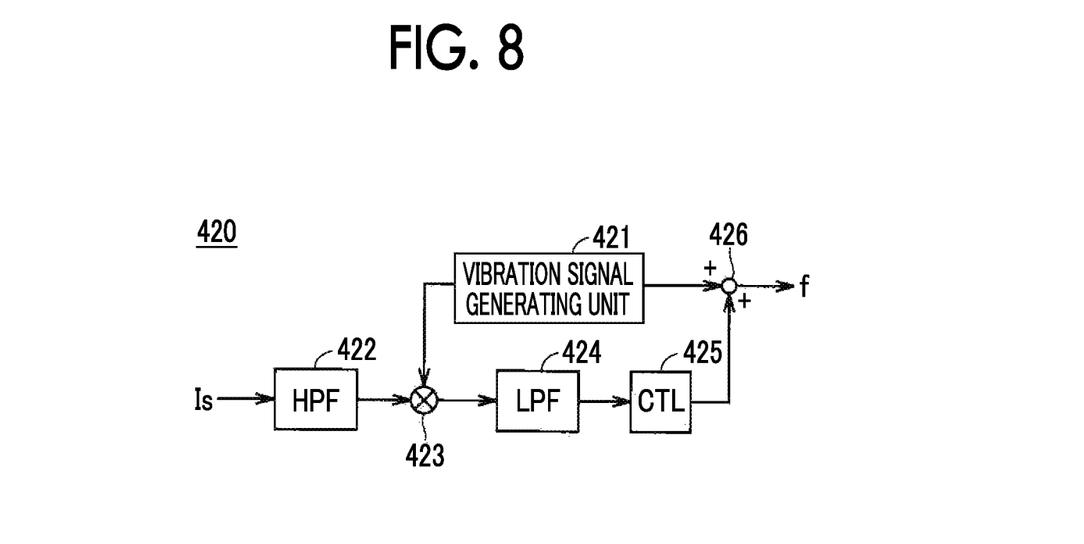
FIG. 8 is a control block diagram of a controller that performs the first frequency tuning control.

FIG. 8 is a control block diagram illustrating the controller 420 that performs the first frequency tuning control. Referring to FIG. 8, the controller 420 includes a vibration signal generating unit 421, a high pass filter (HPF) 422, a multiplier unit 423, a low pass filter (LPF) 424, a controller 425, and an adder unit 426. The extremum search control is performed by these units.

The vibration signal generating unit 421 generates a vibration signal of which the amplitude is sufficiently small and which has a low frequency. In the extremum search control, a change of the transmission power frequency to an optimal frequency (a frequency at which the current Is flowing in the power transmitting coil 242 is minimized) is monitored using the vibration signal.

The HPF 422 receives the detected value of the current Is flowing in the power transmitting coil 242 and output a signal from which a DC component of the current Is has been removed. The HPF 422 serves to extract a slope (a differential coefficient) of the current Is when the transmission power frequency is made to vibrate based on the vibration signal generated by the vibration signal generating unit 421.

The multiplier unit 423 multiplies the vibration signal generated by the vibration signal generating unit 421 by the signal (the differential coefficient of the current Is) output from the HPF 422, and calculates a correlation coefficient between the vibration signal and the current Is. The correlation coefficient indicates an increasing/decreasing direction of the current Is when the frequency is changed.

The LPF 424 extracts a DC component of the correlation coefficient which is calculated by the multiplier unit 423. The output of the LPF 424 indicates an operating direction (an increasing/decreasing direction) of the frequency for changing the frequency to the optimal frequency. The LPF 424 may be omitted.

The controller 425 calculates an amount of operation on the transmission power frequency for changing the transmission power frequency to the optimal frequency based on the output of the LPF 424. The controller 425 calculates an amount of operation of the transmission power frequency, for example, by performing I control (integral control) with the output signal of the LPF 424 as an input.

The adder unit 426 adds the vibration signal generated by the vibration signal generating unit 421 to the output of the controller 425, and sets the calculated value as the transmission power frequency f. By this control structure, it is possible to search for the optimal frequency for minimizing the current Is flowing in the power transmitting coil 242 and to calculate the transmission power frequency f for minimizing the current Is.

<Relationship Between First and Second Frequency Tuning Control> Referring back to FIG. 3, in this embodiment, the power supply ECU 250 performs the first frequency tuning control of tuning the transmission power frequency f such that the current Is flowing in the power transmitting coil 242 is minimized by controlling the inverter 220. The operable range (the tunable range) of the transmission power frequency f is determined, and the power supply ECU 250 tunes the transmission power frequency f in the frequency operable range.

The power supply ECU 250 performs the second frequency tuning control of tuning the resonance frequency of the power transmitting unit 240 such that the transmission power increases generally in the frequency operable range (where the duty of the output voltage of the inverter is kept constant) by adjusting the capacitance of the capacitor 234 of the filter circuit 230. Since a coupling coefficient of the power transmitting coil 242 and the power receiving coil 312 varies depending on the relative positional relationship (a horizontal direction and a gap) between the power transmitting device 10 and the power receiving device 20 and thus the resonance frequency also changes, the capacitance of the capacitor 234 is adjusted to tune the resonance frequency such that a power transmission condition in the frequency operable range is good.

The first frequency tuning control of tuning the transmission power frequency and the second frequency tuning control of tuning the resonance frequency are control associated with frequency, and there is a likelihood of a problem that tuning to an appropriate frequency is impossible or a long time is required for frequency tuning occurring due to interference between the first and second frequency tuning control with control for tuning the transmission power frequency.

Figure 9:
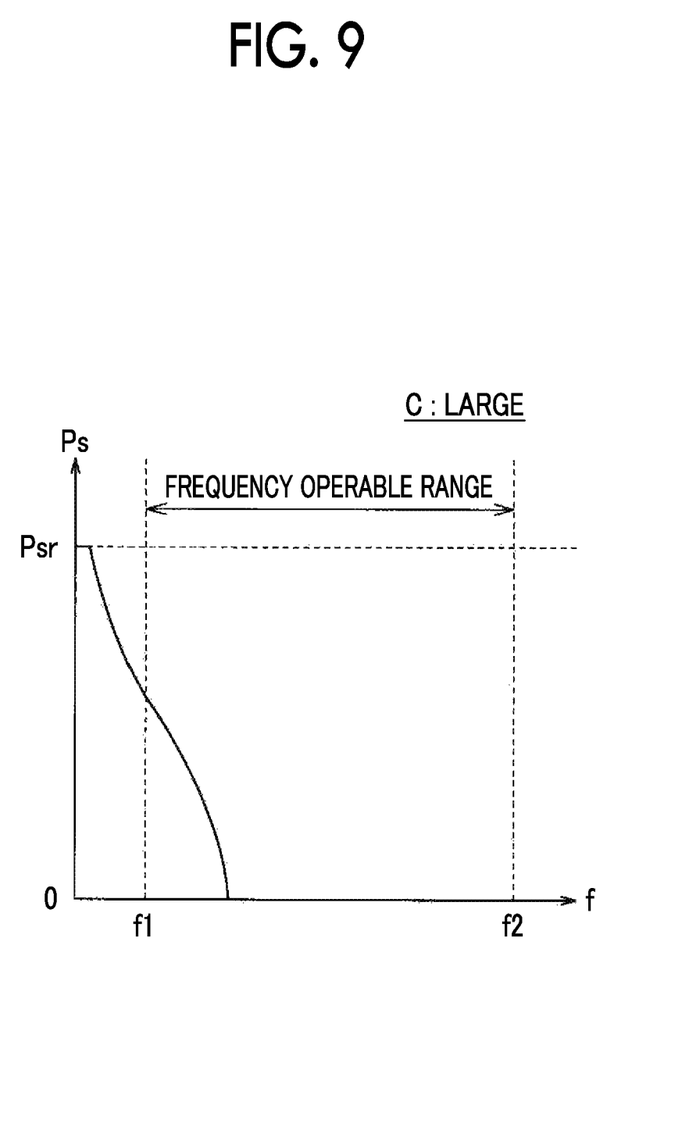
FIG. 9 is a diagram illustrating an example of frequency characteristics of transmission power when a capacitance of a capacitor of the filter circuit is relatively large.
Figure 10:
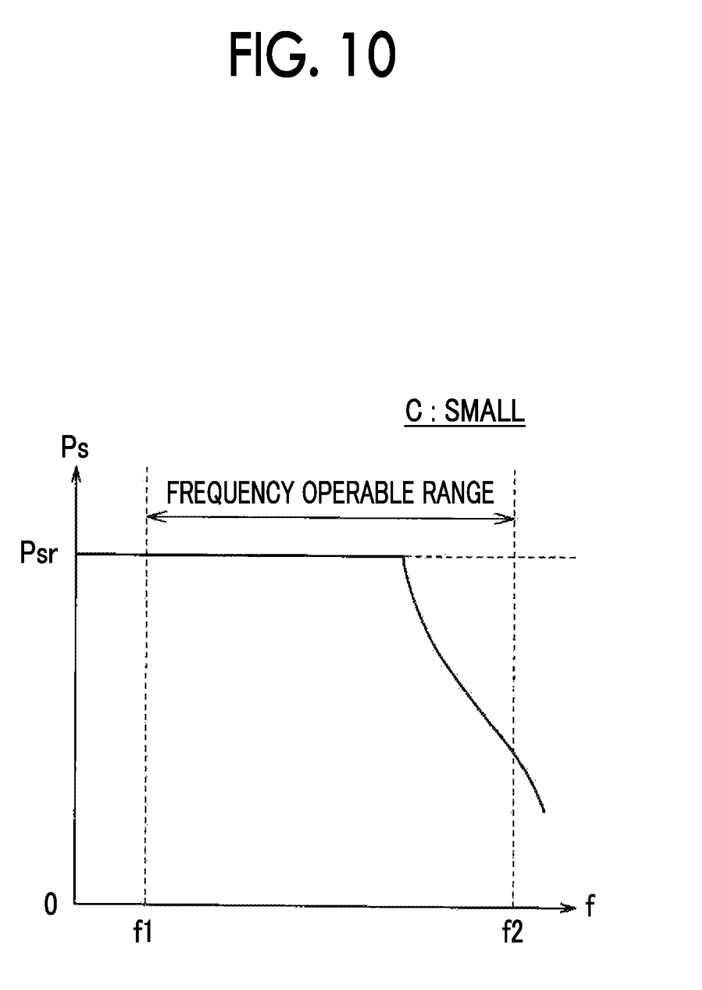
FIG. 10 is a diagram illustrating an example of frequency characteristics of transmission power when the capacitance of the capacitor of the filter circuit is relatively small.

For example, FIG. 9 is a diagram illustrating an example of frequency characteristics of the transmission power Ps when the capacitance of the capacitor 234 of the filter circuit 230 is relatively large. On the other hand, FIG. 10 is a diagram illustrating an example of frequency characteristics of the transmission power Ps when the capacitance of the capacitor 234 of the filter circuit 230 is relatively small. In FIGS. 9 and 10, the horizontal axis represents the transmission power frequency f, and the vertical axis represents the magnitude (for example, an effective value) of the transmission power Ps. A frequency f1 denotes a lower limit of the operable range of the transmission power frequency f, and a frequency f2 denotes an upper limit of the operable range of the transmission power frequency f. That is, the power supply ECU 250 can tune the transmission power frequency f through the first frequency tuning control in the frequency operable range which is defined by the frequencies f1 and f2.

Referring to FIG. 9, when the capacitance C of the capacitor 234 is relatively large (when all the relays 238-1 to 238-3 illustrated in FIG. 6 are turned on), the transmission power Ps cannot be controlled such that it approaches the target power Psr even if the transmission power frequency f is tuned to any value by the first frequency tuning control in the frequency operable range.

On the other hand, referring to FIG. 10, when the capacitance C of the capacitor 234 is relatively small (for example, when at least one of the relays 238-1 to 238-3 is turned off), the frequency characteristics (the resonance frequency) of the transmission power Ps in the frequency operable range is improved and the transmission power Ps can be controlled such that it approaches the target power Psr by the transmission power control.

Here, as described above, the transmission power frequency f is tuned in a predetermined frequency operable range such that the current Is is minimized, it is possible to enhance accuracy of the frequency tuning of the first frequency tuning control while preventing interference of the first and second frequency tuning control by roughly tuning the resonance frequency through the second frequency tuning control (for example, adjustment from the state illustrated in FIG. 9 to the state illustrated in FIG. 10) to improve the frequency characteristics of the transmission power Ps in the operable range of the transmission power frequency f and tuning the transmission power frequency f at a minute frequency interval through the first frequency tuning control after the resonance frequency has been tuned.

Regarding the numbers of times of tuning in the first and second frequency tuning control, it is possible to enhance responsiveness of the first frequency tuning control while preventing interference of the first and second frequency tuning control by setting the number of tunings of the transmission power frequency f using the first frequency tuning control to be larger than the number of tunings of the resonance frequency using the second frequency tuning control.

Therefore, in the power transmitting device 10 according to this embodiment, the transmission power frequency f is tuned at a predetermined frequency interval (for example, a frequency interval corresponding to a minimum resolution of the power supply ECU 250) by the first frequency tuning control, and the resonance frequency is tuned at a frequency interval which is greater than the tuning interval at which the transmission power frequency f is tuned by the second frequency tuning control. Then, the first and second frequency tuning control is performed such that the number of tunings of the transmission power frequency f by the first frequency tuning control is larger than the number of tunings of the resonance frequency by the second frequency tuning control.

That is, in the power transmitting device 10 according to this embodiment, the resonance frequency is roughly tuned with a relatively small number of tunings of by the second frequency tuning control and the transmission power frequency f is finely tuned with a relatively large number of tunings by the first frequency tuning control. Accordingly, interference between the first frequency tuning control and the second frequency tuning control is prevented and the transmission power frequency f is accurately and rapidly tuned by the first frequency tuning control under the resonance frequency which has been roughly tuned by the second frequency tuning control. Accordingly, according to this embodiment, it is possible to prevent interference between the first and second frequency tuning control and to realize rapid tuning of the frequency.

Figure 11:
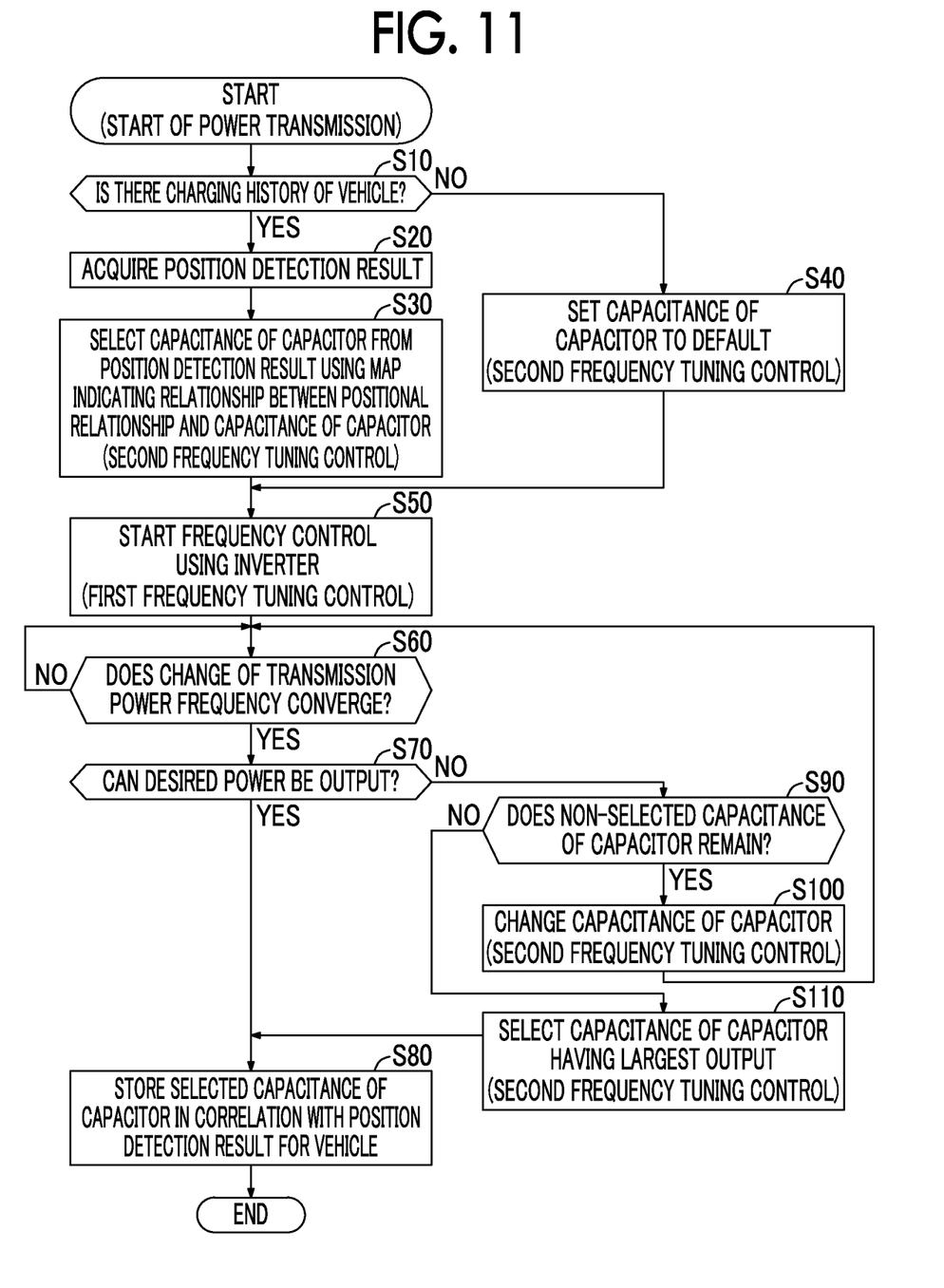
FIG. 11 is a flowchart illustrating a frequency tuning process flow which is performed by the power supply ECU of the power transmitting device.

FIG. 11 is a flowchart illustrating a frequency tuning process flow which is performed by the power supply ECU 250 of the power transmitting device 10. The process flow indicated by the flowchart is performed, for example, when a command to start transmission of electric power is received from the vehicle 1.

Referring to FIG. 11, when transmission of electric power from the power transmitting device 10 to the power receiving device 20 of the vehicle 1 is started, the power supply ECU 250 determines whether there is a charging history of the vehicle 1 (a history in which transmission of electric power from the power transmitting device 10 to the vehicle 1 was performed in the past) (Step S10). The power supply ECU 250 stores information of vehicles having performed transmission of electric power in the past in a memory thereof and can determine whether there is a charging history of the vehicle 1 based on the information.

When the power supply ECU 250 determines that there is a charging history of the vehicle 1 (YES in Step S10), the power supply ECU 250 acquires data (a position detection result) indicating a relative positional relationship between the power transmitting device 10 and the power receiving device 20 as a positioning result of the vehicle 1 relative to the power transmitting device 10 from the vehicle 1 via the communication unit 260 (Step S20).

Subsequently, the power supply ECU 250 reads a map indicating a relationship between the relative positional relationship between the power transmitting device 10 and the power receiving device 20 and the capacitance of the capacitor 234 (FIGS. 5 and 6) of the filter circuit 230 from the memory and selects the capacitance of the capacitor 234 from the position detection result acquired from the vehicle 1 using the read map (Step S30). The map is prepared for each vehicle having received electric power from the power transmitting device 10 in the past, is appropriately partitioned in meshes for the relative positional relationship (the horizontal direction and the gap) between the power transmitting device 10 and the power receiving device 20, and stores past adjustment results of the capacitance of the capacitor 234 for each positional relationship. Then, the capacitance of the capacitor 234 is set based on the data of the mesh corresponding to the position detection result acquired in Step S20.

When it is determined in Step S10 that there is no charging history of the vehicle 1 (NO in Step S10), the power supply ECU 250 sets the capacitance of the capacitor 234 of the filter circuit 230 to a default value (for example, a maximum value) (Step S40). When it is determined in Step S10 that there is a charging history of the vehicle 1 but there is no data of the mesh corresponding to the position detection result, the capacitance of the capacitor 234 is also set to a default value.

Selecting (setting) of the capacitance of the capacitor 234 in Step S30 or S40 corresponds to performing of the second frequency tuning control of tuning the resonance frequency of the power transmitting unit 240.

When the capacitance of the capacitor 234 is set in Step S30 or S40, the power supply ECU 250 starts performing of frequency control (the first frequency tuning control) using the inverter 220 such that the current Is flowing in the power transmitting coil 242 is minimized (Step S50). Thereafter, the first frequency tuning control is always performed at the number of tunings larger than the number of tunings of the resonance frequency in the second frequency tuning control, that is, at a control cycle which is shorter than a time interval of tuning in the second frequency tuning control.

Subsequently, the power supply ECU 250 determines whether a change of the transmission power frequency f in the first frequency tuning control has converged (Step S60). Whether the change of the transmission power frequency f has converged can be determined, for example, depending on whether the change of the transmission power frequency f for each control cycle of the first frequency tuning control or in a predetermined period is less than a predetermined value. When the transmission power frequency f reaches the lower limit or the upper limit (the frequency f1 or f2 in FIGS. 9 and 10) of the operable range, it is also determined that the change of the transmission power frequency f has converged.

When the power supply ECU 250 determines that the change of the transmission power frequency f in the first frequency tuning control has converged (YES in Step S60), the power supply ECU 250 determines whether predetermined transmission power Ps can be output (Step S70). The magnitude of the transmission power Ps is adjusted to the target power Psr by the transmission power control of adjusting the duty of the output voltage of the inverter 220, and for example, when the transmission power Ps does not reach the target power Psr even with the lapse of a predetermined time, it is determined that desired transmission power Ps cannot be output.

When it is determined in Step S70 that the desired transmission power Ps cannot be output (YES in Step S70), the power supply ECU 250 stores the selected capacitance of the capacitor 234 in the map for the vehicle 1 in correlation with the position detection result acquired in Step S20 (Step S80). Accordingly, the map for the vehicle 1 is updated to reflect the frequency tuning result in this power transmission.

When it is determined in Step S70 that the desired transmission power Ps cannot be output (NO in Step S70), the power supply ECU 250 determines whether a non-selected capacitance remains for the capacitor 234 of the filter circuit 230 (Step S90). In this embodiment, as illustrated in FIG. 6, the capacitance of the capacitor 234 can be selected by turning on/off the relays 238-1 to 238-3.

When it is determined in Step S90 that a non-selected capacitance remains (YES in Step S90), the power supply ECU 250 changes the capacitance of the capacitor 234 to the non-selected capacitance (Step S100). When the capacitance of the capacitor 234 is changed, the process flow returns to Step S60, and the first frequency tuning control is performed under the changed capacitance of the capacitor 234.

When it is determined in Step S90 that a non-selected capacitance does not remain (NO in Step S90), the power supply ECU 250 selects the capacitance of the capacitor 234 with the largest output power among the capacitances of the capacitor 234 which have been selected up to now (Step S110). Thereafter, the power supply ECU 250 performs the process of Step S80. Changing of the capacitance of the capacitor 234 in Step S100 and selecting of the capacitance of the capacitor 234 in Step S110 corresponds to performing of the second frequency tuning control of tuning the resonance frequency of the power transmitting unit 240.

When convergence of the change in frequency in the frequency control (the first frequency tuning control) using the inverter 220 in Step S60 is confirmed after the capacitance of the capacitor 234 is selected in Step S30 or S40 or after the capacitance of the capacitor 234 is changed in Step S100, the number of tunings of the transmission power frequency f in the first frequency tuning control is larger than the number of tunings the resonance frequency in the second frequency tuning control.

As described above, in this embodiment, the transmission power frequency f is tuned at a predetermined frequency interval (for example, a frequency interval corresponding to a minimum resolution of the power supply ECU 250) and at a relatively large number of tunings using the inverter 220 (the first frequency tuning control), and the resonance frequency is tuned at a frequency interval greater than the tuning interval of the transmission power frequency f and at the relatively small number of tunings using the capacitor 234 (the second frequency tuning control). Accordingly, interference between the first and second frequency tuning control is prevented and the transmission power frequency f is accurately and rapidly tuned by the first frequency tuning control under the frequency characteristics (the resonance frequency) which have been roughly tuned by the second frequency tuning control. Accordingly, in this embodiment, it is possible to prevent interference between the first and second frequency tuning control in association with the frequency and to realize rapid frequency tuning.

According to this embodiment, the transmission power frequency f is rapidly tuned by the inverter 220 under the resonance frequency based on the capacitance of the capacitor 234 which has been initially set with starting of the transmission of power from the power transmitting device 10. Accordingly, according to this embodiment, it is possible to prevent interference between tuning of the resonance frequency based on setting of the capacitance of the capacitor 234 and control of transmission power frequency using the inverter 220 and to realize rapid frequency tuning.

According to this embodiment, since initial setting accuracy of the capacitance of the capacitor 234 is improved by using the detection result of the relative positional relationship between the power transmitting device 10 and the power receiving device 20, it is possible to realize rapider frequency tuning using the inverter 220.

According to this embodiment, since the capacitor 234 of the filter circuit 230 is used for the second frequency tuning control, it is not necessary to newly provide a capacitor for the second frequency tuning control.

In the above-mentioned embodiment, the transmission power frequency f is finely tuned at a relatively large number of tunings in the first frequency tuning control and the resonance frequency is roughly tuned at a relatively small number of tunings in the second frequency tuning control. However, the transmission power frequency f may be tuned at a relatively small number of tunings in the first frequency tuning control and the resonance frequency may be finely tuned at a relatively large number of tunings in the second frequency tuning control.

That is, the transmission power frequency f may be tuned at a predetermined frequency interval in the first frequency tuning control and the resonance frequency may be tuned at a frequency interval which is smaller than the tuning interval of the transmission power frequency f in the second frequency tuning control. The first and second frequency tuning control may be performed such that the number of tunings of the resonance frequency in the second frequency tuning control is larger than the number of tunings of the transmission power frequency f in the first frequency tuning control. Accordingly, it is possible to prevent interference between the first and second frequency tuning control in association with the frequency and to realize rapid frequency tuning.

In the above-mentioned embodiment, in the first frequency tuning control of tuning the transmission power frequency f, the transmission power frequency f is tuned such that the current Is flowing in the power transmitting coil 242 is minimized, but the first frequency tuning control of tuning the transmission power frequency f is not limited to the control of minimizing the current Is. For example, in the inverter 220, when a recovery current flows in a freewheel diode, there is concern that the freewheel diode will be damaged. In order to reduce the recovery current, the first frequency tuning control may serve to tune the transmission power frequency f in a direction in which a turn-on current decreases when the turn-on current is greater than 0.

In the above-mentioned embodiment, the filter circuit 230 employs a secondary LC filter including the coil 232 and the capacitor 234, but the filter circuit 230 may employ a tertiary or higher LC filter.

It should be understood that the embodiment disclosed therein is exemplary in all points of view and is not restrictive. The scope of the present disclosure is not limited to description of the above-mentioned embodiment but is defined by the appended claims, and is intended to include all modifications within meanings and scopes equivalent to the claims.

What is claimed is:

1. A power transmitting device comprising:
    a power transmitting unit that includes a power transmission coil, the power transmission unit configured to transmit AC transmission power to a power receiving device in a non-contact manner, the power receiving device includes a power receiving coil;
    a first tuner configured to discretely tune a frequency of the transmission power at a first frequency interval;
    a second tuner configured to discretely tune a resonance frequency of the power transmitting unit at a second frequency interval which is greater than the first frequency interval; and
    a controller configured to control the first tuner and the second tuner such that the number of tunings of the transmission power frequency using the first tuner is larger than the number of tunings of the resonance frequency using the second tuner.

2. The power transmitting device according to claim 1, wherein the first tuner includes an inverter configured to generate the transmission power and supply the generated transmission power to the power transmitting unit and to tune the frequency of the transmission power,
    wherein the second tuner includes a capacitor configured to tune the resonance frequency by changing its capacitance, the capacitor being disposed between the inverter and the power transmitting unit, and
    wherein the controller is configured to set an initial capacitance of the capacitor with starting of power transmission from the power transmitting unit and to control the inverter such that the frequency of the transmission power is tuned.

3. The power transmitting device according to claim 2, further comprising a position detector configured to detect a positional relationship of the power receiving coil of the power receiving device relative to the power transmitting unit,
    wherein data indicating a relationship between the positional relationship and the capacitance of the capacitor is prepared, and
    wherein the controller sets the initial capacitance of the capacitor based on the detection result of the position detector with reference to the data.

4. The power transmitting device according to claim 2, wherein the capacitor is a capacitor of a filter circuit that is disposed between the inverter and the power transmitting unit.

5. A power transmission system comprising:
    a power transmitting device; and
    a power receiving device that receives AC transmission power output from the power transmitting device in a non-contact manner, the power receiving device includes a power receiving coil,
    wherein the power transmitting device includes:
        a power transmitting unit that includes a power transmission coil, the power transmission unit configured to transmit AC transmission power to the power receiving device in a non-contact manner;
        a first tuner configured to discretely tune a frequency of the transmission power at a first frequency interval;
        a second tuner configured to discretely tune a resonance frequency of the power transmitting unit at a second frequency interval which is greater than the first frequency interval; and
        a controller configured to control the first tuner and the second tuner such that the number of tunings of the transmission power frequency using the first tuner is larger than the number of tunings of the resonance frequency using the second tuner.

* * * * *